United States Patent
Nagar et al.

(10) Patent No.: US 12,373,200 B2
(45) Date of Patent: Jul. 29, 2025

(54) API OPTIMIZER USING CONTEXTUAL ANALYSIS OF INTERFACE DATA EXCHANGE

(71) Applicant: INTERNATIONAL BUSINESS MACHINES CORPORATION, Armonk, NY (US)

(72) Inventors: Raghuveer Prasad Nagar, Kota (IN); Subha Hari, Bangalore (IN); Aishwarya Saraswathi H M, Bangalore (IN); Jagadesh Ramaswamy Hulugundi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1093 days.

(21) Appl. No.: 17/336,901

(22) Filed: Jun. 2, 2021

(65) Prior Publication Data
US 2022/0391746 A1 Dec. 8, 2022

(51) Int. Cl.
*G06F 8/76* (2018.01)
*G06F 9/54* (2006.01)
(Continued)

(52) U.S. Cl.
CPC .............. *G06F 8/76* (2013.01); *G06F 9/541* (2013.01); *G06N 20/00* (2019.01);
(Continued)

(58) Field of Classification Search
CPC ...... G06F 8/76; G06F 9/541; G06F 2209/542; G06N 20/00; H04L 41/0823; H04L 41/16
See application file for complete search history.

(56) References Cited

U.S. PATENT DOCUMENTS 8,613,004 B2 12/2013 Hacigumus et al.
10,867,120 B1 * 12/2020 Bradley .................. G06F 40/14
(Continued)

FOREIGN PATENT DOCUMENTS

CN 111625510 A 9/2020

OTHER PUBLICATIONS

Prasanna Kumar Illa; How AI is leading to Autonomous Enterprise Integrations; Sep. 14, 2018; https://www.dataversity.net/ai-leading-autonomous-enterprise-integrations/; 5 pages (Year: 2018).*
(Continued)

*Primary Examiner* — Kevin L Young
*Assistant Examiner* — Kimberly L Jordan
(74) *Attorney, Agent, or Firm* — CHIP LAW GROUP

(57) ABSTRACT

A computer-implemented process includes the following operations. Interface data for a first computer application having a first interface configured to exchange data with a second computer application is identified. The interface data is aggregated using a machine learning engine, and the machine learning engine performs contextual analysis on the aggregated interface data to identify a context. A fix pack for the first computer application is generated using the context from the contextual analysis. The fix pack is caused to be applied to the first computer application. The fix pack includes an installable for the first application to transform notations used by the second computer application when communication with the first application.

20 Claims, 9 Drawing Sheets

(51) Int. Cl.
*G06N 20/00* (2019.01)
*H04L 41/0823* (2022.01)
*H04L 41/16* (2022.01)

(52) U.S. Cl.
CPC .... *G06F 2209/542* (2013.01); *H04L 41/0823* (2013.01); *H04L 41/16* (2013.01)

(56) References Cited

U.S. PATENT DOCUMENTS

| | | | |
|---|---|---|---|
| 2009/0132910 | A1 | 5/2009 | Cseri et al. |
| 2019/0163667 | A1* | 5/2019 | Feuz .................. G06F 9/547 |
| 2020/0184109 | A1* | 6/2020 | Gerard ................ H04L 63/08 |
| 2020/0372154 | A1* | 11/2020 | Bacher ............... G06F 16/1834 |
| 2021/0034591 | A1* | 2/2021 | Parkala Srinivas ........................ G06F 16/2379 |
| 2021/0304027 | A1* | 9/2021 | Damodaran ............ G06N 3/08 |

OTHER PUBLICATIONS

Asad, Z. et al., "Greener Data Exchange in the Cloud: A Coding-Based Optimization for Big Data Processing," IEEE Journal on Selected Areas in Communications, Jan. 21, 2016, vol. 34, No. 5, pp. 1360-1377.

Li, B. et al., "Multi-source heterogeneous data exchange system for cloud services platform based on SaaS," In 2015 2nd International Conference on Information Science and Control Engineering, IEEE, Apr. 24, 2015, pp. 327-331.

Janet, J. et al., "Optimizing data movement within cloud environment using efficient compression techniques," In 2016 International Conference on Information Communication and Embedded Systems (ICICES), IEEE, Feb. 25, 2016, pp. 1-5.

Wu, Y. et al., "Service-Oriented Feature-Based Data Exchange for Cloud-Based Design and Manufacturing," IEEE Transactions on Services Computing, Nov. 18, 2015, vol. 11, No. 2, pp. 341-353.

Peng, D. et al., "Using JSON for Data Exchanging in Web Service Applications," Journal of Computational Information Systems, Dec. 2011, vol. 7, No. 16, pp. 5883-5890.

Morishima, A. et al., "A machine learning approach to rapid development of XML mapping queries," In Proceedings of 20th International Conference on Data Engineering, IEEE, Apr. 2, 2004, pp. 276-287.

Mell, P. et al., The NIST Definition of Cloud Computing, National Institute of Standards and Technology, U.S. Dept. of Commerce, Special Publication 800-145, Sep. 2011, 7 pg.

* cited by examiner

```
1  <Order Action="CREATE" DocumentType="0001" EnterpriseCode="Matrix-R"
   PaymentStatus="AUTHORIZED" >
2  <OrderLines>
3       <OrderLine OrderedQty="1" >
4           <Item ItemID="100001" UnitOfMeasure="EACH" />
5       </OrderLine>
6  </OrderLines>
7  <PersonInfoBillTo AddressLine1="1775" AddressLine2="" City=
   "Tewksbury" Company=" " Country="US" DayPhone="" Department="QA"
   EMailID="sh@yantra.com" FirstName="shfirst" JobTitle="" LastName=
   "shlast" MiddleName ="" State="MA" ZipCode="01876" />
8  <PersonInfoShipTo AddressLine1="1775" AddressLine2="" City=
   "Tewksbury" Company="" Country ="US" Dayphone="" Department="QA"
   EMailID="sh@yantra.com" FirstName="shfirst" JobTitle="" LastName=
   "shlast" MiddleName="" State="MA" Zipcode="01876"  />
9  </Order>
```

FIG. 3A

```
1  <Order _1="CREATE" _2"0001" _3="Matrix-R" _4="AUTHORIZED" >
2  <OrderLines>
3       <OrderLine _5="1" >
4           <Item_6="100001" _7="EACH" />
5       </OrderLine>
6  </OrderLines>
7  <PersonaInfoBillTo _8"1775" _9="" _10="Tewksbury" _11="" _12="US"
    _13="" _14="QA" _15="sh@yantra.com" _16="shfirst" _17="" _18=
   "shlast" _19="" _20="MA" _21="01876" />
8  <PersonaInfoShipTo _22="1775" _23="" _24="Tewksbury" _25="" _26="US"
    _27="" _28="QA" _29="sh@yantra.com" _30="shfirst" _31="" _32=
   "shlast" _33="" _34="MA" _35="01876" />
9  </Order>
```

FIG. 3B

```
<Employee EmployeeID="69676" FirstName="Subra" LastName="Jain" EmailId="subra.jain@ibm.com"
ManagerEmailId="shiva.murthy@ibm.com">
    <RestrictedArea>
        <Details DateEntered="04-17-2020 16:30:00" AreaName="D_GF">
    </RestrictedArea>
    <Message Description="Your DR has entered this restricted area. This is FYI/FYA" />
</Employee>
```

FIG. 4A

```
<Employee_1="69676"_2="Subra"_3="Jain"_4="subra.jain@ibm.com"_5="shiva.murthy@ibm.com">
    <RestrictedArea>
        <Details_6="04-17-2020 16:30:00" 7="1">
    </RestrictedArea>
    <Message 8="1" />
</Employee>
```

FIG. 4B

API OPTIMIZER USING CONTEXTUAL ANALYSIS OF INTERFACE DATA EXCHANGE

BACKGROUND

The present invention relates to application program interface (API) optimization, and more specifically, to using contextual analysis of data exchanged between computer interfaces to identify improvements thereto.

Computer applications oftentimes interact with one another using integration mechanisms such as APIs (application program interfaces), FTP, MQ and the like. The input/output documents of these integration mechanisms, such as APIs, can be in different formats like JSON, XML, flat files, etc. In the context of an application running in a business, the application could employ several hundred to thousands of APIs to simultaneously interact with external applications. Depending upon the particular workflow in which these APIs are used, the size of the request and response documents can vary substantially. For example, the order creation input document for an eCommerce application could involve hundreds of attributes and a size of the output document could be in the hundreds of KBs, such as with large orders. For an application that processes 50,000 orders/hour, a document size of just 1 MB could be a could be a potential performance bottleneck not only for the system but also overload the internet/network.

SUMMARY

A computer-implemented process includes the following operations. Interface data for a first computer application having a first interface configured to exchange data with a second computer application is identified. The interface data is aggregated using a machine learning engine, and the machine learning engine performs contextual analysis on the aggregated interface data to identify a context. A fix pack for the first computer application is generated using the context from the contextual analysis. The fix pack is caused to be applied to the first computer application. The fix pack includes an installable for the first application to transform notations used by the second computer application when communication with the first application. Automatically generated feedback regarding the fix pack is forwarded to the machine learning engine. The feedback and the interface data is stored within a block chain ledger. The fix pack includes an installable for the second computer application to generate the notations used by the second computer application. The contextual analysis identifies a particular use for the transaction. The fix pack is generated using previously-submitted feedback regarding the context. The type of the first computer application is a basis for the aggregating the interface data.

A computer hardware system includes a hardware processor configured to perform the following executable operations. Interface data for a first computer application having a first interface configured to exchange data with a second computer application is identified. The interface data is aggregated using a machine learning engine, and the machine learning engine performs contextual analysis on the aggregated interface data to identify a context. A fix pack for the first computer application is generated using the context from the contextual analysis. The fix pack is caused to be applied to the first computer application. The fix pack includes an installable for the first application to transform notations used by the second computer application when communication with the first application. Automatically generated feedback regarding the fix pack is forwarded to the machine learning engine. The feedback and the interface data is stored within a block chain ledger. The fix pack includes an installable for the second computer application to generate the notations used by the second computer application. The contextual analysis identifies a particular use for the transaction. The fix pack is generated using previously-submitted feedback regarding the context. The type of the first computer application is a basis for the aggregating the interface data.

A computer program product includes a computer readable storage medium having stored therein program code. The program code, which when executed by a computer hardware system, cause the computer hardware system to perform the following. Interface data for a first computer application having a first interface configured to exchange data with a second computer application is identified. The interface data is aggregated using a machine learning engine, and the machine learning engine performs contextual analysis on the aggregated interface data to identify a context. A fix pack for the first computer application is generated using the context from the contextual analysis. The fix pack is caused to be applied to the first computer application. The fix pack includes an installable for the first application to transform notations used by the second computer application when communication with the first application. Automatically generated feedback regarding the fix pack is forwarded to the machine learning engine. The feedback and the interface data is stored within a block chain ledger. The fix pack includes an installable for the second computer application to generate the notations used by the second computer application. The contextual analysis identifies a particular use for the transaction. The fix pack is generated using previously-submitted feedback regarding the context. The type of the first computer application is a basis for the aggregating the interface data.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIGS. 3A and 3B respectively illustrate exemplary input XML before and after API optimization according to an aspect of the present invention.

FIGS. 4A and 4B respectively illustrate exemplary input XML, before and after API optimization according to another aspect of the present invention.

DETAILED DESCRIPTION

With the advent of cloud hosting, multi-cloud providers, and micro-service architectures, there is a need to optimize the exchange of data between computer applications 110, 120, 130, 140, for example, by enhancing API performance, tuning network traffic through data size reduction, and utilizing network potential through enhanced bandwidth management for all essential aspects of IT operations. These performance issues can be complicated in a hybrid cloud system which, for example, can include an application hosted on a public cloud interacting with an application within an enterprise as well as interacting with an application within a private cloud.

Figure 1A:
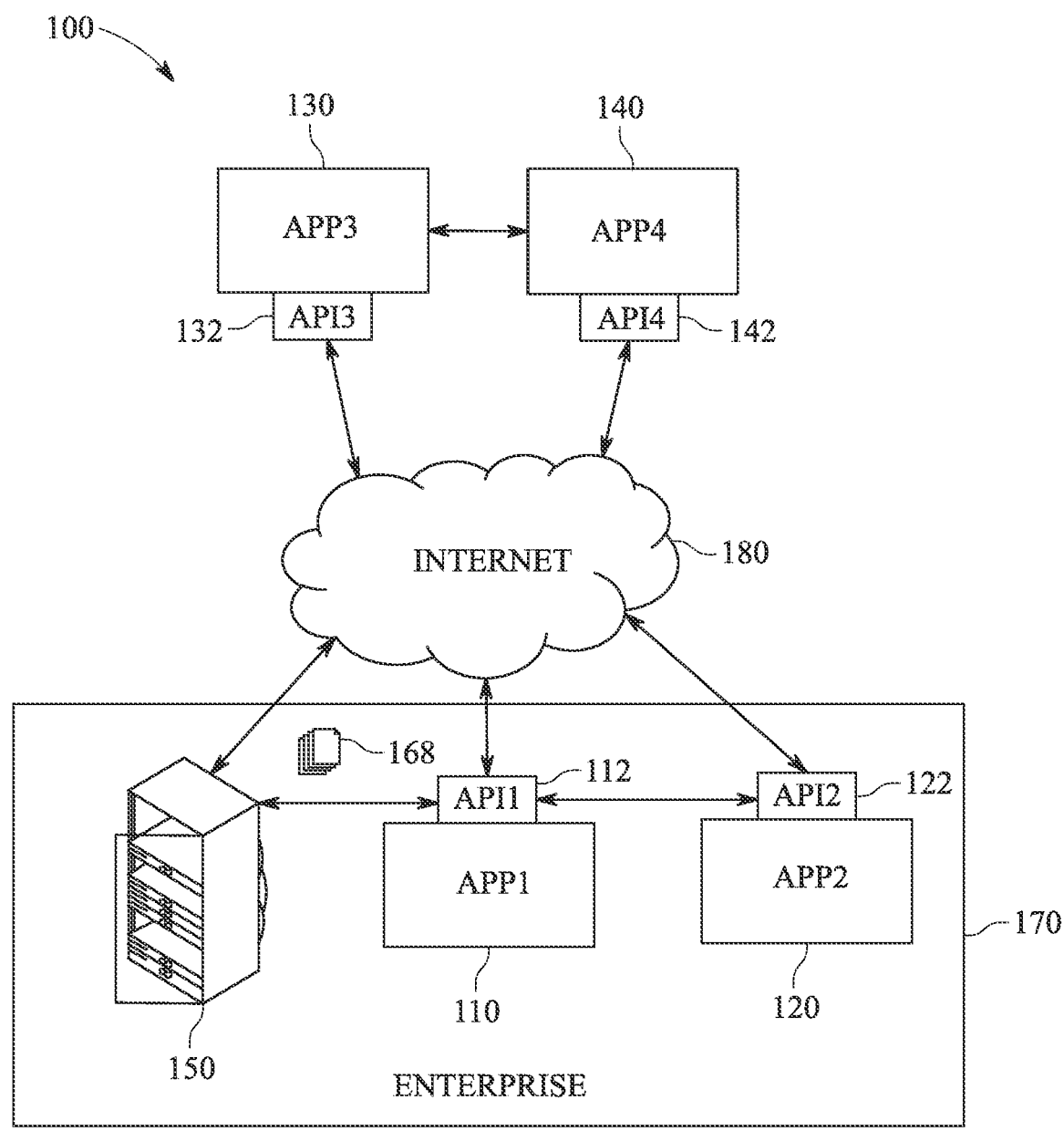
FIG. 1A is a block diagram illustrating an example system architecture for optimizing APIs based upon contextual analysis of data exchanged between interfaces of computer applications.
Figure 1B:
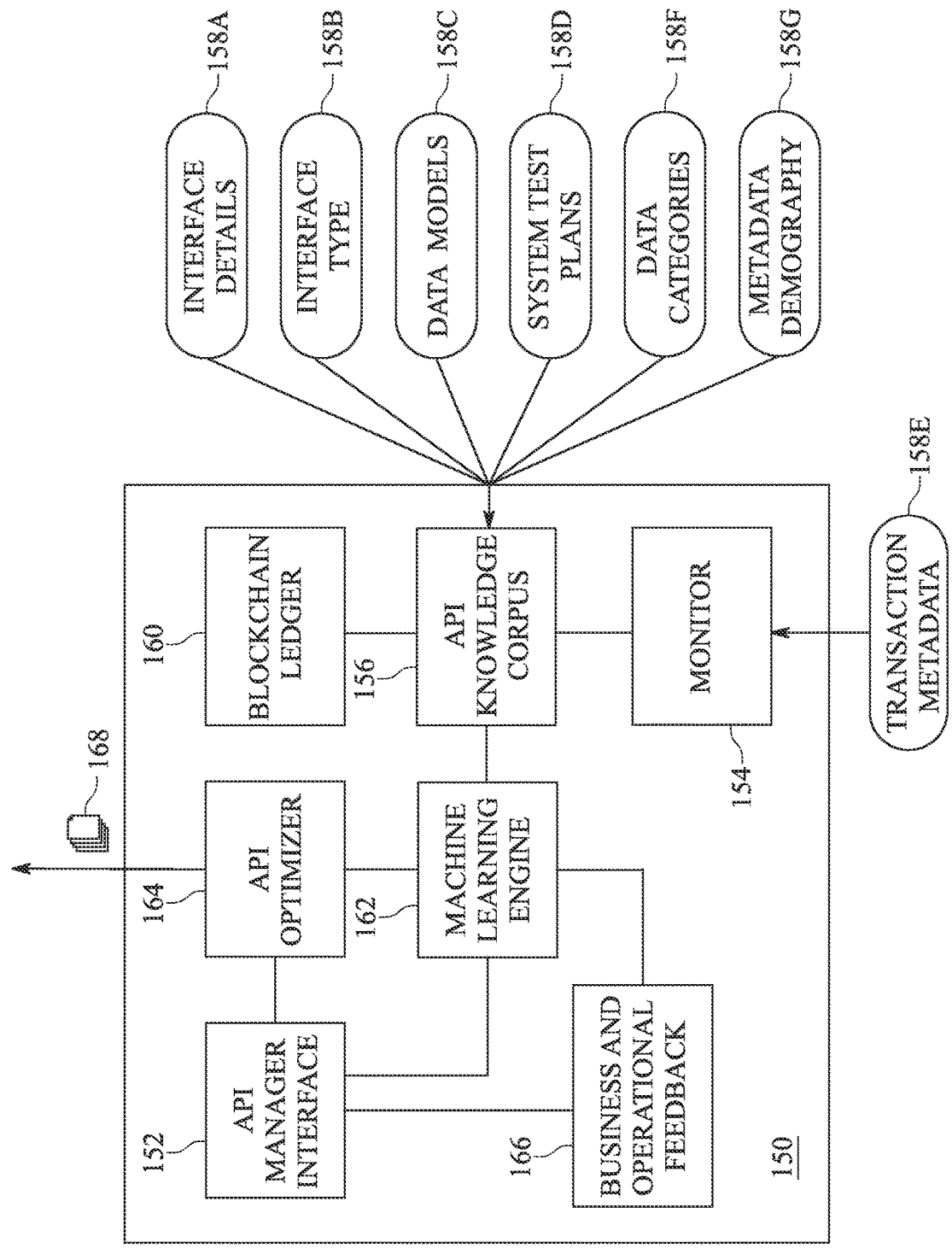
FIG. 1B is a block diagram illustrating an example API optimizing system for use with the system architecture illustrated in FIG. 1A.
Figure 2:
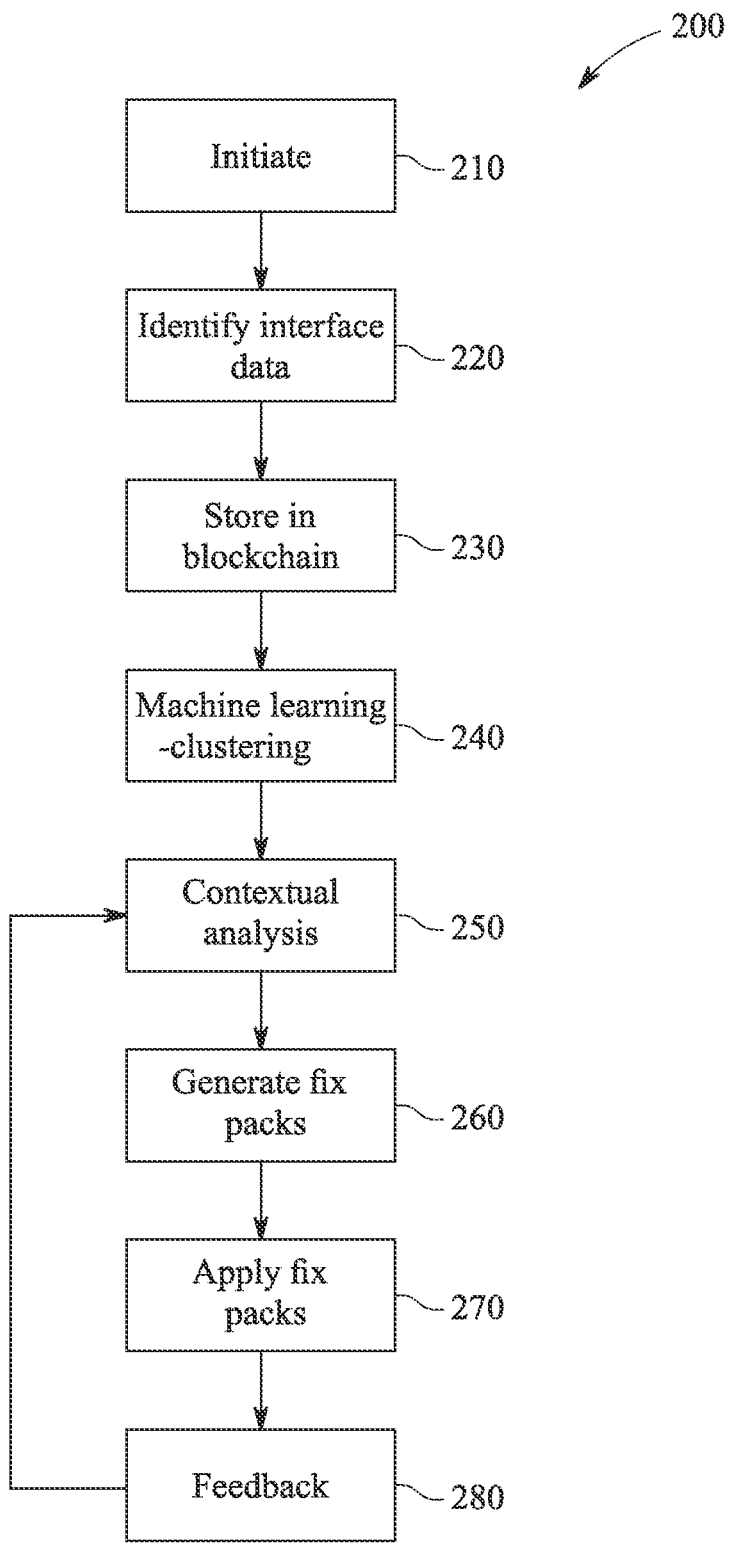
FIG. 2 is a block diagram illustrating an example method using the architecture of FIG. 1A.

Reference is made to FIG. 1 and FIG. 2, which respectively illustrate an architecture 100 and methodology 200 for optimizing APIs (e.g., API1, API2, API3, API4, API5) based upon contextual analysis of data exchanged between interfaces (e.g., APIs) of computer applications 110, 120, 130, 140 according to certain aspects of the present disclosure. The disclosed architecture 100 and methodology 200 is used to perform contextual analysis of the data messages exchanged between applications/micro-services/containers and optimize the request/response data messages with appropriate notation/compression techniques for enhanced API, application, cloud and network performance.

As illustrated, one or more of the computer applications 110, 120 may be found within an enterprise 170 or one or more of the computer applications 130, 140 may be external to the enterprise 170. As used herein, the term "computer application" can also apply to computer-implemented micro-services, containers, and pods.

The applications 110, 120 may interact within one another inside the enterprise 170 or an application 110 inside the enterprise 170 may interact with one or more external applications 130, 140 using, for example, the internet 180. In certain instances, the external applications 130, 140 can be provided by a third-party provider, for example, located in a public cloud. In other instances, one or more of the external application 130, 140 can be in a private cloud of the enterprise 170 (not shown). As another example, one or more of the external applications 130, 140 can be in a hybrid cloud, which is a combination of a private cloud and a public cloud (not shown).

For ease of reference, the present disclosure discusses optimizing the API1 (i.e., API 112) for APP1 (i.e., computer application 110). However, the disclosure is not limited in this manner as the architecture 100 and methodology 200 can be used with an number of computer applications 110, 120, 130, 140 (e.g., APP1, APP2, APP3, APP4) and regardless of the location of the computer applications 110, 120, 130, 140. For example, the computer application 110 being evaluated can be either internal or external to the enterprise. Additionally, the present disclosure is not limited to optimizing a single computer application 110. Rather, the architecture 100 and methodology 200 described herein can be used to optimize one or more computer applications—either serially or in parallel.

As an example, two computer applications 110, 120 may be communicating with one another such that application 120 is requesting data from application 110, and application 110 is requesting data from application 120. The API 112, 122 for a particular application 110, 120 defines what kind of data is being retrieved from that particular application 110, 120 and the syntax used by another application for retrieving that data. The present architecture 100 and methodology 200 can be used to optimize the API for just one or both of the applications.

In 210, the API optimizing system 150 can be activated using, for example, an API manager interface 152 that acts as an interface to a user. The API optimizing system 150 can automatically collect, using a monitor 154, data exchanged between interfaces 112, 122 of the applications 110, 120. In certain aspects, the API optimizing system 150 can be activated by a request submitted through the API manager interface 152 for recommendations regarding the optimization of particular API 112.

In 220, the API optimizing system 150 identifies ground truths associated with the API 112 of the application 110. These ground truths can be stored within or otherwise accessible by a API knowledge corpus 156. Ground truths include interface data 158A-G that can be obtained from multiple enterprise applications. One type of interface data 158A accessible by the API knowledge corpus 156 is interface details associated with the API 112, which include data contained in an XSD (XML Schema Definitions). An XSD expresses a set of rules for a particular schema, and an XML document is considered valid if the document conforms to these rules. Other types of schema, for example, include JSON scheme and WSDL-based web services.

Another example of interface data 158B accessible by the API knowledge corpus 156 is interface types for the API 112. Examples of interface types include asynchronous and synchronous. More specific examples include REST (representational state transfer), SOAP (simple object access protocol), RPC (remote procedural call protocol) and MQ (message queue). Still another example of interface data 158C accessible by the API knowledge corpus 156 is designed data models for a database (not shown) accessible by the application 110. This can include information about the data contained in the database, the relationship between data items, and constraints on the data and can take the form of a database object view. Another example of interface data 158D accessible by the API knowledge corpus 156 includes system test plans and test execution results from system testing (also referred to as integration testing). System testing focuses on sanctity of designed API-based interfaces between 1: many applications.

Still further examples of interface data 158E accessible by the API knowledge corpus 156 includes transaction and metadata of individual business applications 110, 120, 130. This interface data 158E can be collected in real-time by a monitor 154 based upon data exchanges between the APIs 112, 122, 132, 142 or the applications 110, 120, 130, 140.

Other examples of interface data 158F accessible by the API knowledge corpus 156 includes categories of the data being exchanged with the application 110, such as public, private, classified, and confidential. Still another example of interface data 158G accessible by the API knowledge corpus 156 is metadata demography. For example, for a particular business application 110, this may include departments and merchandise being sold, stores and associated regular foot falls, store orders on daily, average, peak basis, and customer segments, loyalty, and brand affinity.

In 230, the API knowledge corpus 156 can store some or all of this interface data 158A-G on a blockchain ledger 160. Use of a blockchain ledger 160 involves shared processing. Other aspects of using a blockchain ledger 160 is secure, distributed, ordered, and write-once characteristics. Not only is a blockchain ledger 160 efficient to manage, a blockchain ledger 160 provides traceability and visibility of interface exchange. This is valuable in instances in which hybrid cloud components of several applications undergo regular patches, security packs, hot fixes, and data model revisions over a period of time. The interface data 158A-F can be received from several disparate sources, such as third party applications and partner applications. By storing some or all of this interface data 158A-F, this interface data 158A-F becomes immutable within the blockchain ledger 160, which allows for trust in the integrity of the interface data 158A-F for current and future uses by the machine learning engine 162.

The blockchain ledger 160 also enables traceability of the contextual analysis during interface data exchange. This traceability is valuable for training and retraining the models employed by the machine learning engine 162. Complex IT ecosystems (i.e., the aggregation of applications 110, 120, 130, 140) can have, for example, hundreds to thousands of interfaces. Additionally, these applications are oftentimes subject to changes, whether as upgrades and/or to fix problems. The traceability of these changes in the complex IT ecosystem can be difficult to manage. In this instance, use of the blockchain ledger 160 can provide a common and secure platform from which to store, audit, and retrieve interface data involving the APIs.

In 240, the interface data 158A-F can be aggregated by a machine learning engine 162, for example, using a K-Means clustering model where each type of application in an integrated solution can constitute its own cluster. By way of example, the contextual analysis may identify that sellers always use an Order Number in a request and carriers always use Shipment Number in a request. As another example, the machine learning engine 162 may identify that a particular API 112 for an application 110 having a large number of attributes that is used by both retail data consumers and manufacturing data consumers. In this instance, the machine learning engine 162, by separately clustering the retail and manufacturing data consumers, can identify that requests from retail data consumers seek attributes 1, 2, 3 while requests from manufacturing data consumers always seek attributes 4, 5. As will be discussed with regard to 260, these knowledge can be used to recommend different notation schemes for the retail data consumers versus the manufacturing data consumers.

Examples of message type can include, for example order status inquiry, shipment tracking number, banking ATM withdrawal, recharge pre-paid wallets, among others. Examples of transaction type include asynchronous and real-time synchronous. By way of example, exceptions and boundary value definitions include that a debit card withdrawal limit will be $10,000 per day and alphanumeric values in quantity attributes.

In 250, the machine learning engine 162 performs a contextual analysis on the aggregated/clustered interface data 158A-F using unsupervised machine learning techniques. The goal of the contextual analysis is to derive a relationship for contextual understand of messages exchanged between the applications 110, 120, 130, 140. Aspects of the analysis rely upon request/response details of the API interface 112, 122; source and target applications 110, 120; message type; transaction type, and exceptions and boundary value definitions for the API interfaces 112, 122. The request/response details can include message structure with elements and attributes along with data type, such as number, big decimal, string, and Boolean.

The source and target applications 110, 120 can be supplied by a single or multiple subscribers or publishers. Interface data exchange between applications can be 1:1, 1:many, many:many, or many:1. The machine learning engine 162 is configured to permit a particular existing application 110 to be optimized to be defined as or a source (i.e., the application providing the data) or a target application (i.e., the application requesting the data). Relationships between the existing application 110 and other applications 120, 130, 140 with which the application 110 interface can also be defined by the machine learning engine. Alternatively, a search tool (e.g., IBM's Watson Search) can be employed to identify a new interface for a new source or target application.

In 260, based upon the contextual analysis performed by the machine learning engine 162, an API optimizer 164 generates a fix pack 168 for the application 110. Although not limited in this manner, the fix pack 168 can include an update to integration/API documentation such as online documentation (e.g., http or https-based documentation accessible online) or offline documents (e.g., doc or ppt files), an installable for the application 110, and an installable for the client/user (e.g., application 120) of the application 110. Although discussed as a single entity, the fix pack 168 can be comprised of multiple components that are separately generated and distributed, as appropriate. The API optimizer 164 can use known compression/notation algorithms/schemes based upon the contextual information generated by the machine learning engine 162. Examples of the compression/notation is discussed in more detail with regard to FIGS. 3A-3B, 4A-4B. Specifically, the compression/notations generated are specific to the messages exchanged between the applications (e.g., 110 and 120) and in the context of the transaction. The context of the transaction can refer to how the transaction is being used. For example, the context may be a security access related, commerce ordering related, ATM withdrawal for banking related, etc. For any particular context of the transaction, the API optimizer 164 may have already experienced the particular context and generated a set of notations based upon the context. However, every time this particular transaction occurs, the API optimizer 164 reevaluates the set of notations using additional information (e.g., previously-submitted feedback for the same context) and recommend a new set of notations.

Whether or not an attribute is considered for optimizing can be based upon machine learning thresholds that involve a minimum/maximum level of feature values to be considered, which can be set manually and dynamically changed based upon machine learning and received feedback. For example, one threshold may be based upon a frequency in which the attribute or attribute value is used. As the frequency increases, the attribute or attribute value can be a candidate for notation. As another example, if a common number of subscriptions reaches a particular level (e.g., an attribute is used for some threshold amount by a predetermined-number of subscribed applications), the attribute/attribute value could also be a candidate for notation.

In certain instances, a fix pack 168 can be generated that can be used to optimize the logging associated with individual applications. Debugging logs (also referred to as stack traces) store contemporaneously-generated data such as success and failure messages and are associated with particular applications 110, 120, 130, 140. These messages also include data elements, attributes and values. Thus, the API optimizer 164 can, based upon a contextual understanding of the kind of stack message, stack message structure, etc., be used to generated a fix pack 168 that optimizes the generation of data within these debugging logs in a similar manner to the generation of a fix pack 168 for API optimization.

In 270, once the fix pack 168 has been generated, the fix pack 168 will be installed, as needed. For example, the fix pack 168 can be used to update the API integration documentation. Additionally, the fix pack 168 can include a server-side installable to be used with the server-side application (e.g., APP1 110) in order to transform the notations generated by the client-side application (e.g., APP2 120) into the real value of the attribute and/or attribute values. The fix pack 168 can also include a client-side installable for the client-side application (e.g., APP2 120) as needed that will be used to transform attributes/values into notations.

In 280, the API manager interface 152 can be used to supply business and operational feedback 166 into the machine learning engine 162 about the fix pack 168, which can also be stored by the API knowledge corpus 156 in the blockchain ledger 160. This feedback 166 can be provided, for example, by the cloud offering manager, cloud architect, or other appropriate personnel. Alternatively, the feedback 166 can be generated automatically based upon, for example, a particular event acting as a trigger. For example, if the system 150 identifies that a certain number of similar interface message have failed over a wrong mapping, feedback 166 regarding the mapping can be generated.

The feedback 166 can be provided periodically, after a particular event, or on an ad hoc basis. The feedback 166 can also be provided for the fix pack 168 as a whole, individual portions of the fix pack 168, and/or for each attribute/attribute value being modified. The feedback 166 can identify productive identification codes (e.g., notations) versus unproductive identification codes. The machine learning engine 162 can, for example, apply reinforcement learning techniques to improve the creation of subsequent fix packs 168 by rewarding productive identification codes and penalizing unproductive identification codes.

Figure 5A:
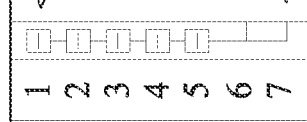
FIGS. 5A and 5B respectively illustrate exemplary input XML before and after API optimization according to yet another aspect of the present invention.
Figure 5B:
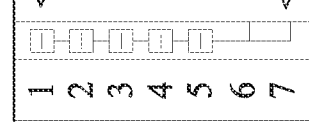

A first example of API optimization is shown in FIGS. 5A, 5B, which respectfully illustrate exemplary input XML, describing an Order Create transaction prior to and after API optimization. In this example, the API interface is between a frontend, order-capturing application and a backend order management application. The input XML of FIG. 3A illustrates a traditional exchange mechanism. In this instance, the size of the XML document is 723 bytes. Assuming, for example, that the frontend, order-capturing application generally receives 50,000 orders in 1 hour, then approximately 36 MB of data is transferred between the two applications prior to API optimization.

In FIG. 3B, after API optimization and application of an API fix, every attribute in the input XML is assigned a unique number/notation. For example, "Action" is assigned the number "1", "DocumentType" is assigned the number "2", EnterpriseCode is assigned the number "3", and so on. In so doing, the input XML has a size of 517 bytes, as compared to the previous size of 723 bytes. Thus, if 50,000 orders are generated in 1 hour, then approximately 25 MB of data is transferred between the two applications, which is a 30% reduction in the amount of data transferred, which represents an improvement to how the system as a whole performs.

A second example of API optimization is shown in FIGS. 4A, 4B, which respectfully illustrate exemplary input XML describing a security application transaction prior to and after API optimization. In this example, the API interface is between a security application and an enterprise active directory system of a (HRMS) human resources and management system that is used for authentication and authorization to restricted areas in a data center. The input XML of FIG. 4A illustrates a traditional exchange mechanism.

In FIG. 4B, after API optimization and application of an API fix, every attribute in the input XML is assigned a unique number as in the first example. For example, "EmployeeID" is assigned the number "1", "FirstName" is assigned the number "2", "LastName" is assigned the number "3", and so on. Additionally, the API fix assigns notations based on a particular context of the message. For example, the API optimization process learns that the attribute values for "AreaName" and "Description" are fixed values, and thus, the attribute values can also be assigned notations. For example, the value for "AreaName" is always "D_GF", and this value can then be replaced with the notation of "1", which designates a fixed value. Similarly, the value for "Description" is always "Your DR has entered this restricted area. This is FYI/FYA," and this value can also be replaced with the notation of "1."

Another example of API optimization is shown in FIGS. 4A, 4B, which respectively illustrated exemplary input XML describing another approach to a security application transaction prior to and after API optimization. If the same employee is authenticated to a restricted area and the employee is granted access to few servers for performing read/write/delete operations, the API optimization understands the context of such transaction operations on servers belonging to specific business domains and can interact with domain specific IT applications to raise flags, as appropriate. In this manner, the notations generated can be specific to the messages exchanged but in the context of a transaction that is very different from an earlier transaction.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 6:
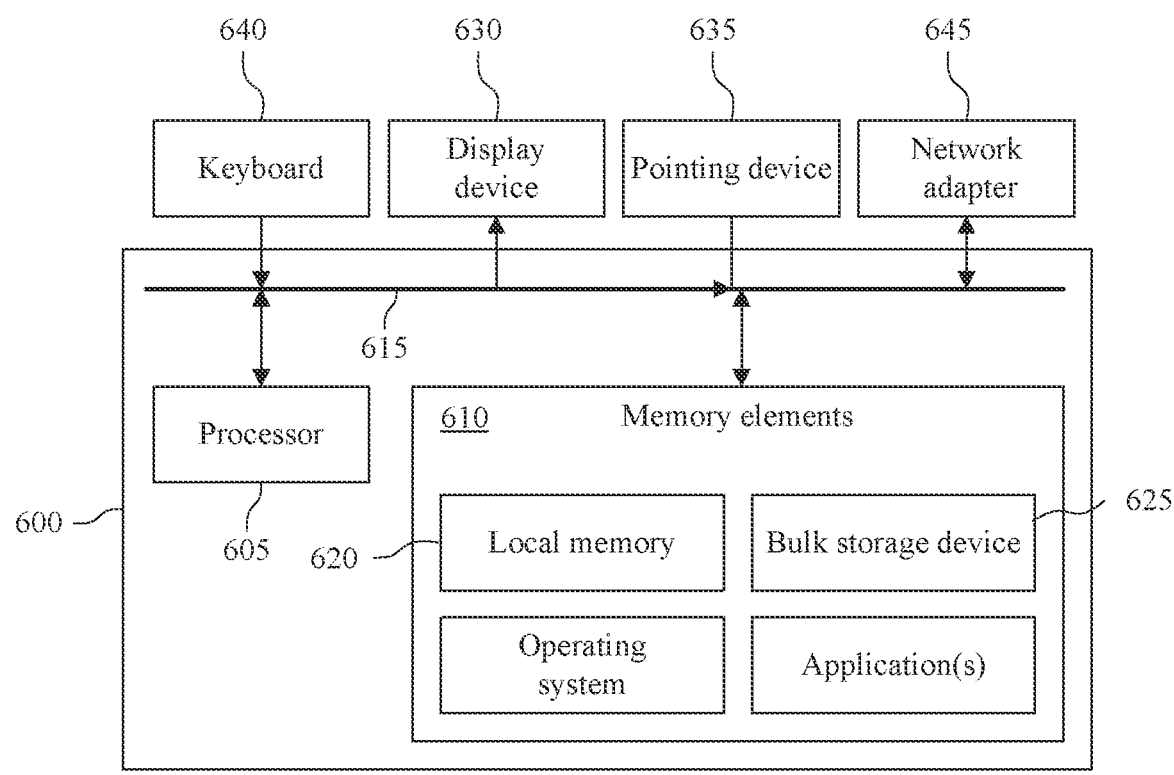
FIG. 6 is a block diagram illustrating an example of computer hardware system for implementing the API optimizing system of FIG. 1B.

FIG. 6 is a block diagram illustrating example architecture for a data processing service 600 for executing the API optimizing system 150. The data processing system 600 can include at least one processor 605 (e.g., a central processing unit) coupled to memory elements 610 through a system bus 615 or other suitable circuitry. As such, the data processing system 600 can store program code within the memory elements 610. The processor 605 can execute the program code accessed from the memory elements 610 via the system bus 615. It should be appreciated that the data processing system 600 can be implemented in the form of any system including a processor and memory that is capable of performing the functions and/or operations described within this specification. For example, the data processing system 600 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 610 can include one or more physical memory devices such as, for example, local memory 620 and one or more bulk storage devices 625. Local memory 620 refers to random access memory (RAM) or other non-persistent memory device(s) generally used during actual execution of the program code. The bulk storage device(s) 625 can be implemented as a hard disk drive (HDD), solid state drive (SSD), or other persistent data storage device. The data processing system 600 also can include one or more cache memories (not shown) that provide temporary storage of at least some program code in order to reduce the number of times program code must be retrieved from the local memory 620 and/or bulk storage device 625 during execution.

Input/output (I/O) devices such as a display 630, a pointing device 635 and, optionally, a keyboard 640 can be coupled to the data processing system 600. The I/O devices can be coupled to the data processing system 600 either directly or through intervening I/O controllers. For example, the display 630 can be coupled to the data processing system 600 via a graphics processing unit (GPU), which may be a component of the processor 605 or a discrete device. One or more network adapters 645 also can be coupled to data processing system 600 to enable the data processing system 600 to become coupled to other systems, computer systems, remote printers, and/or remote storage devices through intervening private or public networks. Modems, cable modems, transceivers, and Ethernet cards are examples of different types of network adapters 645 that can be used with the data processing system 600.

As pictured in FIG. 6, the memory elements 610 can store the components of the API optimizing system 150 of FIG. 1B. Being implemented in the form of executable program code, these components of the data processing system 600 can be executed by the data processing system 600 and, as such, can be considered part of the data processing system 600.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
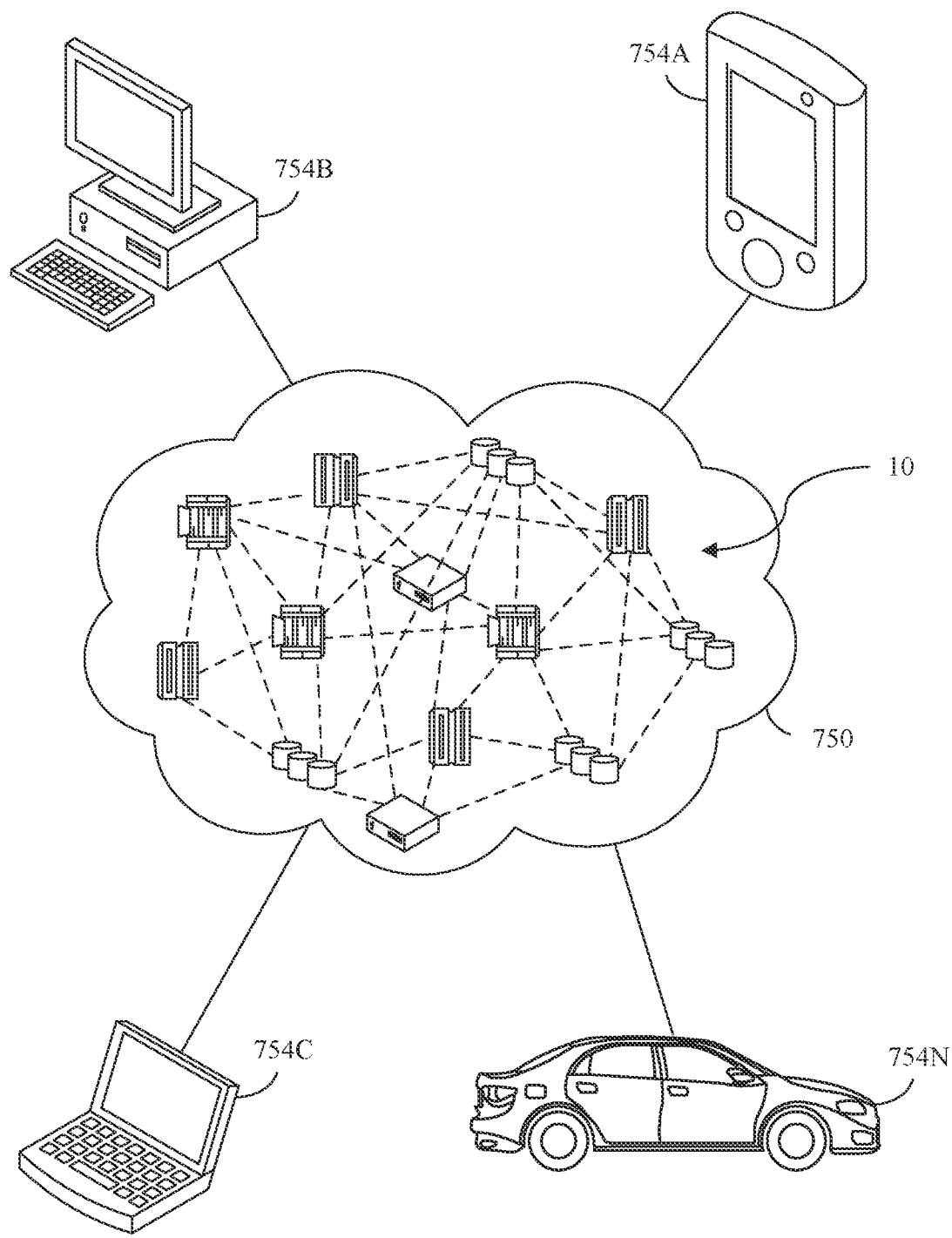
FIG. 7 depicts a cloud computing environment according to an embodiment of the present invention.

Referring now to FIG. 7, illustrative cloud computing environment 750 to be used with the API optimizing system is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
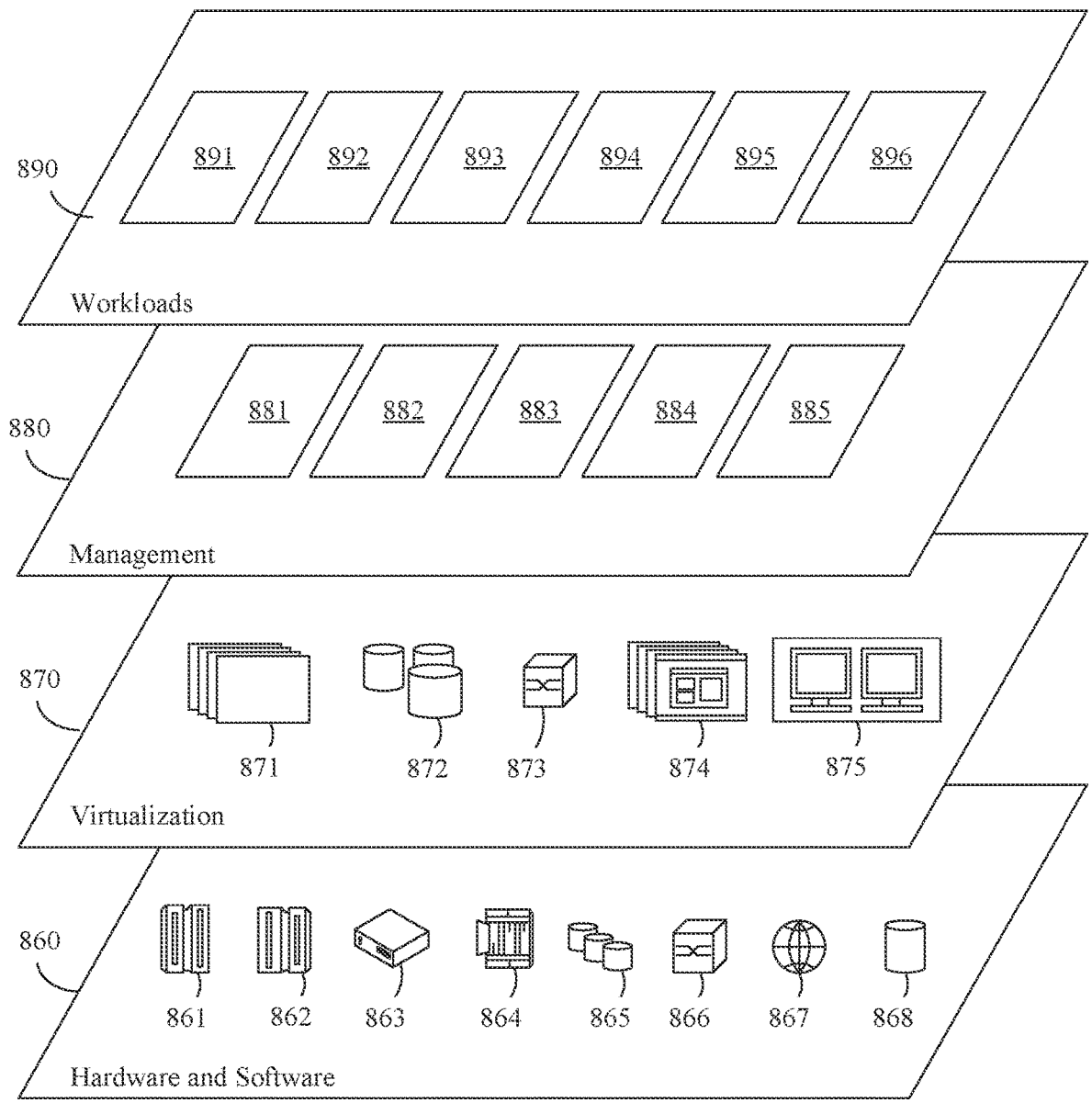
FIG. 8 depicts abstraction model layers according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and operations of the API optimizing system 896.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented process, comprising:
   identifying interface data for a first computer application having a first interface configured to exchange data with a second computer application;
   aggregating, using a machine learning engine, the interface data;
   performing, using the machine learning engine, contextual analysis on the aggregated interface data to identify a context;
   generating, using the context from the contextual analysis, a fix pack for the first computer application; and
   causing the fix pack to be applied to the first computer application, wherein
   the fix pack includes an installable for the first application to transform notations used by the second computer application when in communication with the first application.

2. The method of claim 1, wherein
automatically generated feedback regarding the fix pack is forwarded to the machine learning engine.

3. The method of claim 2, wherein
the feedback and the interface data is stored within a block chain ledger.

4. The method of claim 1, wherein
the fix pack includes an installable for the second computer application to generate the notations used by the second computer application.

5. The method of claim 1, wherein
the interface data includes transaction and metadata, and the contextual analysis identifies a particular use for the transaction.

6. The method of claim 1, wherein
the fix pack is generated using previously-submitted feedback regarding the context.

7. The method of claim 1, wherein
a type of the first computer application is a basis for the aggregating the interface data.

8. A computer hardware system, comprising:
   a hardware processor configured to perform the following executable operations:
   identifying interface data for a first computer application having a first interface configured to exchange data with a second computer application;
   aggregating, using a machine learning engine, the interface data;
   performing, using the machine learning engine, contextual analysis on the aggregated interface data to identify a context;
   generating, using the context from the contextual analysis, a fix pack for the first computer application; and
   causing the fix pack to be applied to the first computer application, wherein
   the fix pack includes an installable for the first application to transform notations used by the second computer application when in communication with the first application.

9. The system of claim 8, wherein
automatically generated feedback regarding the fix pack is forwarded to the machine learning engine.

10. The system of claim 9, wherein
the feedback and the interface data is stored within a block chain ledger.

11. The system of claim 8, wherein
the fix pack includes an installable for the second computer application to generate the notations used by the second computer application.

12. The system of claim 8, wherein
the interface data includes transaction and metadata, and the contextual analysis identifies a particular use for the transaction.

13. The system of claim 8, wherein
the fix pack is generated using previously-submitted feedback regarding the context.

14. The system of claim 8, wherein
a type of the first computer application is a basis for the aggregating the interface data.

15. A computer program product, comprising:
   a computer readable storage medium having stored therein program code,
   the program code, which when executed by a computer hardware system, cause the computer hardware system to perform:
   identifying interface data for a first computer application having a first interface configured to exchange data with a second computer application;
   aggregating, using a machine learning engine, the interface data;
   performing, using the machine learning engine, contextual analysis on the aggregated interface data to identify a context;
   generating, using the context from the contextual analysis, a fix pack for the first computer application; and causing the fix pack to be applied to the first computer application, wherein
the fix pack includes an installable for the first application to transform notations used by the second computer application when in communication with the first application.

16. The computer program product of claim 15, wherein automatically generated feedback regarding the fix pack is forwarded to the machine learning engine.

17. The computer program product of claim 16, wherein the feedback and the interface data is stored within a block chain ledger.

18. The computer program product of claim 15, wherein the fix pack includes an installable for the second computer application to generate the notations used by the second computer application.

19. The computer program product of claim 15, wherein the interface data includes transaction and metadata, and the contextual analysis identifies a particular use for the transaction.

20. The computer program product of claim 15, wherein the fix pack is generated using previously-submitted feedback regarding the context.

\* \* \* \* \*